Nov. 10, 1931. H. K. KOUYOUMJIAN 1,831,013
APPARATUS FOR HEATING LIQUIDS, COFFEE MAKING, AND THE LIKE
Filed June 11, 1928 2 Sheets-Sheet 2
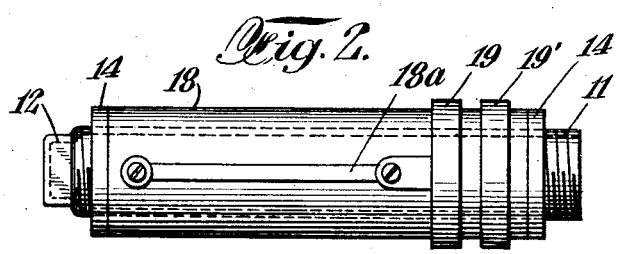
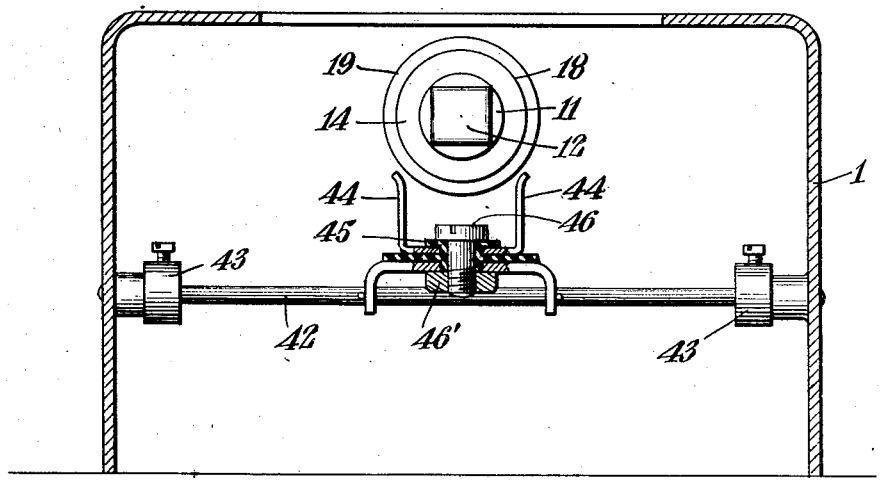
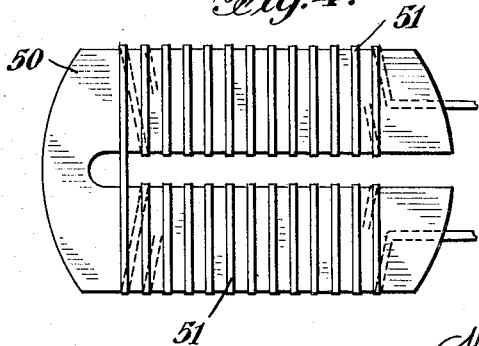
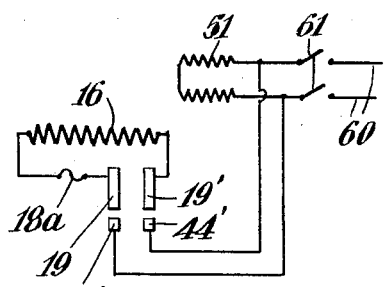
Inventor
Haroutiun K. Kouyoumjian
By his Attorneys
Edwards, Sager & Power Patented Nov. 10, 1931

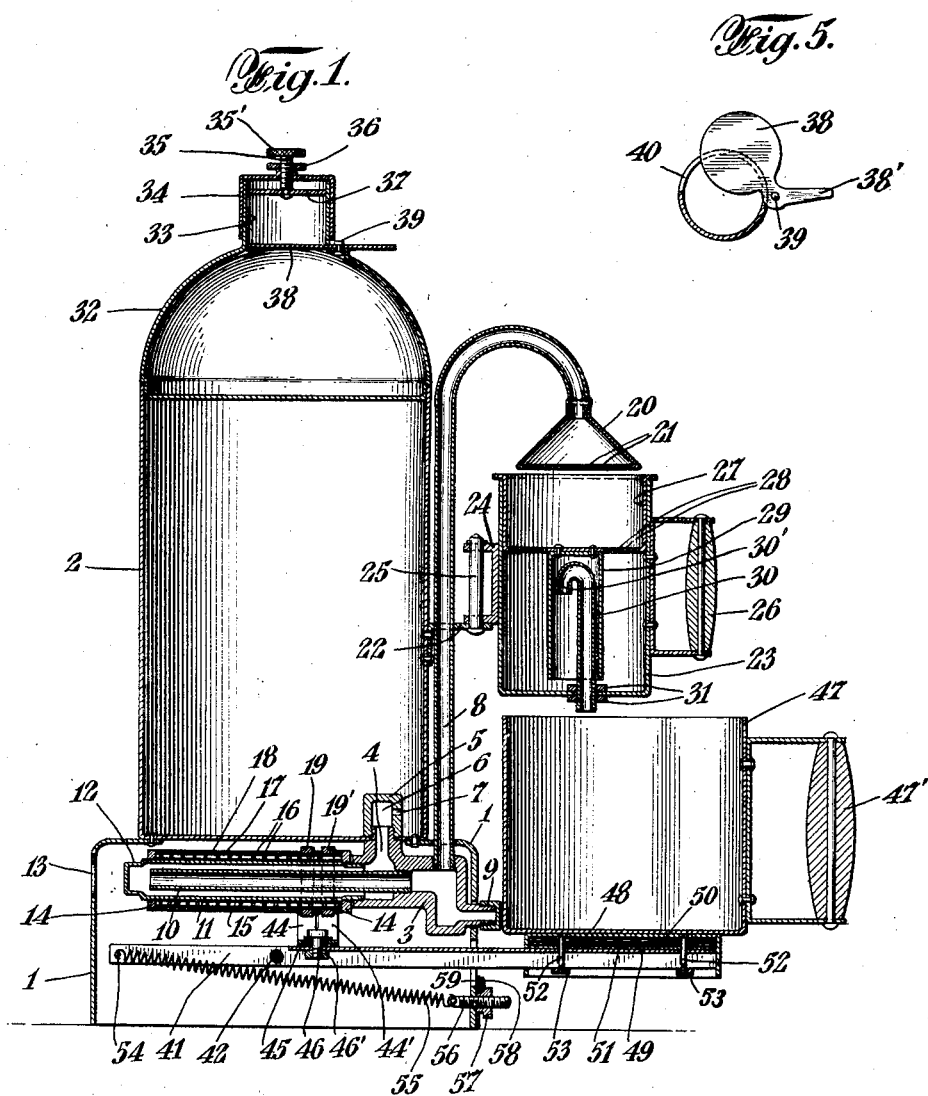

1,831,013

UNITED STATES PATENT OFFICE

HAROUTIUN K. KOUYOUMJIAN, OF PROVIDENCE, RHODE ISLAND

APPARATUS FOR HEATING LIQUIDS, COFFEE MAKING, AND THE LIKE

Application filed June 11, 1928. Serial No. 284,334.

This invention relates to an improved method and apparatus for heating liquids in definite quantity and particularly relates to making coffee, although it is also applicable to making tea or other beverages; and in the following description and apparatus the heating is accomplished electrically.

With particular reference to the making of coffee, the usual method of cooking on the stove is undesirable for a number of reasons, such as requiring considerable time in making it and in watching the cooking to see that it cooks enough and yet not too much, the inconvenience, the inability to succeed in always making good coffee, owing to unavoidable variations in the time of heating or boiling, variations in the amount of water and coffee used, particularly when the amount required varies, the necessity of variation in time which the coffee stands on the grounds after being cooked and before being poured, the inability to keep the coffee hot after being made at a desirable temperature without deterioration of the quality, the requirement of special aids in an attempt to secure clearness of the beverage, the requirement of permitting the cooked beverage to settle before being poured, the cleaning of the coffee pot, together with various other difficulties due to interruptions and changed conditions in the attempted making of good coffee, which are unavoidable.

Various devices and methods have been resorted to in order to avoid the usual difficulties in the attempt to make good coffee, such as the use of percolators, and electrically heated devices, but many of the objections to the primitive method still remain, such as the passing of the liquid several times through the coffee causing it to have a bitter taste, the variations in the amount and time of heating and in the relative amount of water and coffee used from time to time causing unsatisfactory results in failing to secure good coffee, the necessity of watchfulness and attention, the requirement of cleaning of the various parts after each use of the device and moving about of the device and its parts, the inability of making a palatable single cup of coffee by any of the devices or methods available owing to difficulty in properly regulating the amount of water and coffee and to the fact that the size of the device is usually adapted for making at least several cups of coffee, and various other difficulties which arise in making one or more cups of good coffee always of the same delicious quality.

Aside from the obvious desirability of avoiding the necessity of time, labor and watchfulness in making coffee, it is essential in the making, in order to secure satisfactory results, that fresh water be passed through the coffee only once and not repeatedly passed therethrough, that the water have a high temperature and the same temperature when passed through the coffee, that the water be caused to pass uniformly throughout the body of the coffee and not trickle through any one or more concentrated paths, that the same relative amount of water and coffee be used for securing uniform results, that the uncertainty of operation and the variations of operation be avoided, and that the coffee when made be kept at a high temperature without deterioration until it is ready to be used.

The main object of the present invention is to provide an improved method and improved apparatus for making coffee and other beverages which will avoid the various objections of prior methods and devices and at the same time secure the production of exceptionally good coffee with uniformity and always of the same high quality and of the particular strength to suit individual taste. Among the various objects and advantages of the invention may be mentioned the production of the coffee without watchfulness or any material work, certainty of operation and uniformity in results, maintaining the coffee hot until ready for use without deterioration of the beverage, avoidance of any material cleaning after each use, cleanliness and avoidance of any overflow during use, durability and reliability in operation, and capability of adjustment for automatically securing any desired fixed number of cups during operation of the device. Another important object is to not only splash the water at high temperature over the ground coffee so as to uniformly cover it, but also to do this intermittently so that the hot water will have an opportunity to settle and drain through the ground coffee before it is subjected to another splash of water at high temperature. This intermittent splashing action not only insures all of the ground coffee being subjected uniformly to the passage of the hot water, but gives an opportunity for slow passage therethrough so as to extract the essence of the coffee, and also avoids overflow of the water. Other advantages and objects of this invention will be understood from the following description and accompanying drawings which illustrate a preferred embodiment of this invention.

Fig. 1 is a vertical central cross-section; Fig. 2 is a plan view of the removable heating unit; Fig. 3 is an end view of certain parts at the lower portion of the device looking at the end of the removable unit of Fig. 2, certain parts being shown in section for clearness; Fig. 4 is a plan view of another heating unit of the apparatus; Fig. 5 is a detailed view showing a portion of the device for measuring the ground coffee; and Fig. 6 is a diagram of electrical connections.

Referring to Fig. 1, a sheet metal base 1 is of cylindrical form having its upper end turned inwardly to form a support for the cylindrical water container 2. Below the water container and within the base 1 is a device for heating the water intermittently to form steam. This comprises a metal casting 3 having an upper inlet 4 which projects through a hole in the bottom of the container 2 and is secured thereto by a hollow cap 5 which has a threaded engagement with the end of the outlet 4 and thus clamps the unit 3 in place against the bottom of the container by engagement thereof against a shoulder of a portion of the outlet 4. The chamber 6 of the cap 5 has an outlet 7 in the side thereof communicating with the water in the container 2, the top of the cap being closed. The unit 3 also supports a tube 8 extending upwardly therefrom along the outside of the container 2 and has a screw threaded engagement with the unit 3 so as to communicate with the interior thereof and at the upper portion thereof. A lower outlet from the unit 3 is closed by a screw cap 9 which is adapted to be removed for occasional cleaning.

From the middle portion of the unit 3 a tube 10 extends horizontally under the container 2 and has a threaded engagement with the central horizontal opening of the unit 3. The left-hand opening of unit 3 is somewhat enlarged to receive the threaded end of a metal tube 11. The opposite end of tube 11 is shaped to form a square headed nut 12 so that this tube and the parts carried thereby may be conveniently removed for repair or replacement by inserting a wrench through an opening 13 in the base 1.

The metal tube 11 has threaded thereon, at opposite ends, the metal collars 14. A thin layer 15 of mica or other suitable insulating material is wrapped around the tube 12 between the collars 14 and over this insulating layer is wound the resistive or heating conductor 16. Another layer of mica or suitable insulating material 17 envelopes the resistive conductor and over this is moulded an insulating coating 18 such as bakelite, or the unit may be covered with an insulating coating of vitreous enamel, cement or the like. Two contact rings 19, 19' encircle the inner end of the heating unit being moulded in place in the bakelite or otherwise secured in position and spaced and insulated from each other. The ends of the resistive conductor 16, or heating coil, are electrically connected to the contact rings 19, 19' respectively, one connection passing through the low temperature fuse 18a mounted on the exterior of the tube, as shown in Fig. 2.

The outlet tube 8 is shown as extending upwardly and having its upper end bent to form a semi-circle and carries at its downwardly projecting upper end, by a sliding tight fit, a cone shaped sprayer 20, the base of the cone having numerous small perforations 21 over its surface. Supported from a bracket 22 on the side of the container 2 is a cylindrical reservoir 23 open at the top and closed at the bottom. This reservoir has a bracket 24 on its inner portion adapted to swivel on a pin 25 supported by the bracket 22, and also has a handle 26 secured to the side of its outer portion.

In the upper part of the reservoir 23 is fitted a removable container 27 adapted to hold the ground coffee. This is of cylindrical form open at the top and having its outer edges adapted to engage the top of the reservoir 23 to hold the same in position. The bottom of the container 27 has a number of small perforations 28.

To the under side of the central portion of the bottom of the container 27 is riveted a cylindrical tube 29 open at its lower end and closed at its upper end. This tube extends quite closely to the bottom of the reservoir 23. Within the tube 29 is a second tube 30 open at both ends and having its upper end turned in the form of a semi-circle with a downwardly projecting portion 30' of comparatively short length. The tube 30 passes through an opening in the bottom of the reservoir 23 and its lower end is threaded to receive the clamping nuts 31 on opposite sides of the bottom of the reservoir, giving a tight joint. The tube 30 is threaded over a considerable length at its lower end to permit adjustment, as may be desired, of the height of the upper inlet of tube 30 with reference to the bottom of the reservoir 23 for the purpose hereinafter explained. The relationship of the two tubes 29 and 30, as described, gives a siphon of a compound nature.

The top of the main container 2 is closed by a cover 32, shown of dome shape and fits over the top of the container so as to be easily removable. This cover is closed at its lower end, as shown in Fig. 1 of the drawings, so as to form a chamber of considerable capacity. The top of the dome terminates in a cylindrical portion 33 of reduced diameter; and its open upper end is covered by a cylindrical cap 34. The closed upper end of the cap carries at its center an adjustable screw 35 having threaded engagement therewith. The screw 35 is provided at its upper end with a milled head 35' for convenient manual adjustment and a similar manually adjustable nut 36 engages the top of the cap 34, or boss thereon, to lock the screw 35 in place after adjustment. The lower end of the screw 35 carries a disk 37 which has a sliding fit with the interior of the cylindrical portion 33 of the cover.

At the lower portion of the cylinder 33 a disk 38 is adapted to close this cylindrical portion from the lower portion of the cover. The disk 38 is pivotally mounted on a vertically extending pin 39 fixed to the outer portion of the cover near the lower end of the cylinder 33 and has an outwardly extending handle 38', as particularly shown in Fig. 5. The cylinder 33 is provided at its lower end with a narrow semi-circumferential slot 40 so as to permit the disk 38 to be moved outwardly on its pivot 39 to permit open communication between the main portion of the cover and the cylindrical portion 33 thereof. When the disk 38 is moved back within the cylinder 33, by means of the handle 38', it closes communication between this portion of the cover and the main dome shaped portion of the cover.

The means for automatically controlling the water heating, for terminating the same at a predetermined number of cups, or unit measurements of the liquid or beverage, and the means for keeping the same hot after being made, will now be described. Within the base 1 and extending outwardly therefrom at one side is a sheet metal support or lever 41, as shown in the lower portion of Fig. 1 and in Fig. 3. This lever is U-shaped along its length with the sides turned downwardly. A shaft 42 extends at right angles to the lever 41 across the base 1 at about the middle thereof and is supported at opposite ends in opposite walls of the base 1, as shown in Fig. 3, and is held in place by locking collars 43. This shaft passes through the side walls of the lever 41 and serves as a pivotal support for the lever. At one side of the shaft 42, a pair of U-shaped contact clips 44, 44' are carried by the lever 41 and are suitably insulated therefrom and from each other by the insulation 45 shown in Figs. 1 and 3, the contact clips and insulation being held in position by a clamping screw 46 which passes through the lever 41. A nut 46' on the inner end of the screw 46 co-operates therewith to hold the parts in fixed position. The contact clips 44, 44' are so located on the lever as to extend upwardly and respectively engage, when raised, the contact rings 19, 19'.

At the outer end of the lever 41 is carried a platform for supporting the receptacle 47 having a handle 47' for convenient handling. This receptacle is located so as to be under the outlet of the tube 30 of the siphon and may be conveniently placed on, or removed from, the platform carried by the lever 41. This platform comprises a sheet metal covering element 48 which extends outwardly from both sides of the lever 41 and may be conveniently bent down at its edges to cover the outer portion of the controlling lever and interior parts. Immediately above the lever 41 and within the cover 48 is a steel plate 49 extending outwardly from the lever 41. A heating unit is located above this steel plate and within the cover 48. One form of construction of this heating unit is shown in Fig. 4 and comprises a two-legged layer of mica 50 and a resistive conductor 51 wound around each leg of the mica, as shown in Fig. 4, to form a pancake type of unit. Another layer of mica is placed on each side of this heating unit between the same and the metal plate 49, and also between the heating unit and the cover 48. The parts are clamped together by screws 52 extending downwardly through the platform and lever and engaging crossbars 53 which in turn engage the lower edges of the lever 41.

At the opposite end of the lever 41 is a cross-pin 54 which is engaged by one end of a tension spring 55. The other end of the spring is connected to the inner end of an adjustable screw 56 which passes freely through the base 1 at the opposite side of the base from the distant end of the spring and below the lever 41 and pivot shaft 42. The screw 56 has threaded engagement with a milled nut 57 located on the outside of the base 1 and bearing against the outside of the base. This nut is milled and adapted for convenient hand adjustment. It carries a pointer 58 which passes over the face of a scale plate 59 located on the outside of the base 1. This scale is marked so that the nut 57 may be adjusted to give any predetermined number of cups of coffee, or other liquid, before the apparatus is automatically controlled to terminate the heating of the water.

The electrical connections are shown in Fig. 6. The usual building supply wires 60 are connected to the apparatus through any suitable form of switch 61, such as a wall or cord switch. The two wires are directly connected to the resistive conductor 51 of the platform; and the two wires are also connected to the contact clips 44, 44′. As already stated, the resistive conductor 16 is connected to the two contact rings 19, 19′ through the fuse 18a.

The operation and use of the apparatus will be particularly described with reference to the making of coffee. The container 2 is filled, or nearly filled, with water. The cover 32 is filled with ground coffee and the cap 34 replaced. The position of the disk 37 is adjusted to such position as will give the desired strength for say one cup of coffee. With the cap 34 in place and the disk 38 moved outwardly, the cover 32 is turned upside down so as to permit the ground coffee to fill the cylindrical portion 33 of the cover with the adjusted position of the disk 37. The disk 38 is then pushed within the cylinder 33 and the cap 34 removed. The amount of coffee thus measured and now in the cap 34 is turned into the container 27, the latter having been swung side-wise from under the sprayer 20. If more than one cup of coffee is desired, another measured amount of coffee is taken from the cover 32 and placed in the container 27 and the operation repeated until just enough coffee is placed in the container 27 for the desired number of cups. Obviously the disk 37 of the measuring cap may be adjusted to measure the coffee for more than one cup at a time, if desired. The cover 32 is replaced on the water container and the container 27 and reservoir 23 is then swung back under the sprayer 20. The receptacle 47 is placed empty on the lever platform. The weight of the receptacle 47 when empty is not sufficient to depress the outer end of the lever 41; consequently, the spring 55 holds the receptacle 47 in its upper position and the contact clips 44, 44′ are caused to respectively engage the contact rings 19, 19′. The tension on the spring 55 has been adjusted by means of the nut 57 to terminate the operation of the apparatus at the completion of making the desired number of cups of coffee.

When the supply circuit of the apparatus is closed, the current passing through the resistive conductor 16 will quickly heat the water within the tubes 10 and 11, the water from the container 2 having passed through the opening 7 and filled the tubes 10 and 11, the element 3 and a portion of the tube 8 with water. The water within tube 11 is heated by the resistor 16 to such an extent as to generate steam at comparatively high temperature, as the pressure is that due to the height of the water in the container 2.

The steam finds one outlet through the tube 10 and up through the tube 8, heating the water in its path, and when the water is sufficiently heated and the pressure of the steam sufficiently high, the steam and water is carried up through the tube 8 under considerable pressure and is splashed out through the sprayer 20 over the entire amount of coffee in the container 27. In the meantime, steam formed within the tube 11 endeavors to find its way out through the cap 5 and opening 7 into the container 2; but when the steam enters the cap 5 the latter acts as a condenser, because it is surrounded by water at normal temperature. Thus the steam within the cap 5 instead of passing out through the opening 7 is condensed. This results in lowering the pressure within the cap 5 and a certain additional amount of water passes through the opening 7 into the chamber 6 of the cap which still further cools the steam and water. This temporarily stops the generation of steam and increase of pressure within the heating unit and, of course, stops the forced spraying of steam and water upon the coffee in the container 27.

The heating now re-commences until steam is again generated and the action above described is repeated. Thus the action is intermittent, fresh water being taken in small amounts intermittently from the container 2; and water at high temperature, and at practically the same temperature, is intermittently sprayed over the coffee in the container 27.

The amount of water and steam which is forced out in any one splashing or spraying action into the container 27 is such that it covers or moistens all of the coffee, but is not sufficient to overflow and is preferably of a comparatively small amount. Then when a certain splashing of the hot water and steam over the coffee has been made and the action temporarily stops, the hot water has an opportunity to slowly settle down through the coffee in the container 27 and pass through the perforations 28 into the reservoir 23 before another splashing or spraying operation occurs. The action continues as above described until the reservoir 23 has been filled to such an extent as to start the siphon emptying action.

It will be understood that the intermittent action above described causes the prepared coffee beverage to gradually accumulate in the reservoir 23, with the result that the level thereof gradually rises as the liquid drains through the coffee in the container 27. When the level of the beverage rises in tube 29 and in the upper portion of tube 30 as to overflow into the long portion of tube 30, a siphon action takes place to cause the continuous flow of the beverage through the tube 30 and into the receptacle 47. This continues until the level of the beverage in reservoir 23 has been reduced to the lower end of the tube 29. By the use of two tubes for the siphon action instead of one, the complete emptying of the long length of tube 30 is insured at the time the siphon action stops; and also insures a definite action and the same definite amount of the beverage passing out of the reservoir 23 upon the occurrence of each siphon action. This compound siphon arrangement likewise avoids resultant continued dripping from the tube 30 after the siphon action ceases. This will be understood by appreciation of the fact that after the siphon action starts, the liquid will continue to rise in the tube 29 until the liquid in reservoir 23 has been reduced to the level of the lower end of tube 29. Then, as soon as air is drawn into the tube 29, the siphon action is broken and at the completion thereof, the remaining liquid in the tube 29 falls. This stops all siphon action with reference to tube 30 giving air at the inlet thereof and since the inlet leg of the tube 30 is short compared to the outlet leg, all of the liquid in the tube 30 will pass into the receptacle 47 in a definite manner and completely clears the tube 30 of any liquid, thus avoiding any later slow dripping therefrom, and also definitely fixing the amount of the liquid which will pass out in any one siphon action. After the siphon action is completed, unless some other controlling action takes place, the apparatus will continue to intermittently spray the coffee in the container 27 with hot water and steam and cause the beverage to gradually again accumulate in the reservoir 23 to such a level as to again cause the siphon action. Obviously, by adjustment of the height of the inlet of tube 30, by means of its threaded connection with the base of reservoir 23, the amount of liquid delivered in any one siphon action may be made whenever desired.

The automatic control of the apparatus is of such a character that there is no careful balancing of forces to control the cut-off, as this would necessarily result in undesired variations from time to time due to variable conditions of friction, variations in position of the receptacle 47 on the platform, use of different receptacles and the like. Such variations and resulting indefinite action would, of course, result not only in variations in the amount of the beverage made, but also in the strength of the beverage. By the present invention, the amount of the beverage or liquid to be obtained in any one operation of the apparatus is definitely predetermined and fixed. The controlling action is given a range of permissible variables between limits without affecting the control of the apparatus, or the amount of beverage delivered.

For example, it may be assumed that the nut 57 is adjusted to produce the making of two cups of coffee. Under such conditions the tension of the spring 55 will be such that it will hold the platform carrying the receptacle 47 up when one cup, or one siphon discharge, has been delivered to the receptacle 47, but will not hold it up when two cups have been so delivered. The nut 57 should be adjusted so that say about 1½ cups will cause the platform and receptacle 47 to drop, overcoming the tension of the spring 55 and breaking the circuit at the clips 44, 44' and contact rings 19, 19'. After the first cup has been delivered to the receptacle 47, the second cup has been accumulating in reservoir 23. When delivery thereof to the receptacle 47 takes place, the platform drops upon delivery of about 1½ cups, but the delivery will continue even though the platform is dropped until the full second cup has been siphoned out of the reservoir 23. Thus there is a wide leeway in the cutting off of the action between the one cup and two cup quantities, while at the same time insuring the definite delivery of two cups of coffee and no more, the two cups being quite accurately measured by the siphon action. Similarly, if nut 57 be adjusted to any other desired number of cups, the action results in the definite control, so that the required number of cups and no more will be delivered.

It is evident that if any of the particles of the ground coffee pass through the perforations 28 of the container 27, they will not be carried into the receptacle 47, but will settle in the bottom of the reservoir 23. In fact, pulverized coffee may be used if desired, although most satisfactory results are obtained by use of finely ground coffee.

It will be understood that tea or other beverages may be made by this apparatus and method and likewise may be used for the production of a definite amount of any heated liquid.

When the controlling action is automatically stopped, the liquid delivered to the receptacle 47 is maintained heated, until used, by the heating unit within the platform at the outer end of the lever 41, the resistor 51 being continuously in circuit, even after the heating of the liquid from the container 2 has been terminated. Thus the coffee or other beverage is kept hot without any deterioration or change, in the receptacle 47, until used.

It may be noted that when the platform and receptacle 47 are in their upper position the engagement of the contact clips with the contact rings 19, 19' serve as a stop, thus insuring good contact for normal operation. When the weight of the receptacle 47 and liquid contained therein is such as to cause the platform to drop, it breaks the heating circuit and strikes the lower edge of the opening in the base 1 which serves as a stop. If desirable, an adjustable screw may be secured to the base 1, as the stop for the lever 41 in its lower position. When the platform and receptacle 47 drops, it does not necessarily cause the spring 55 to pass across the center of pivot shaft 42, but in some cases this may be preferable. In the case of its passing the dead center, or coming near the dead center, the platform will, of course, remain in its lower position after the receptacle 47 is removed; and in starting the operation again the platform will be manually raised.

After use of the apparatus, the reservoir 23 is swung to one side from under the sprayer 20 and removed for rinsing out the container 27 and reservoir 23, after which the parts are replaced ready for further use.

Although a preferred embodiment of this invention has been shown and described, it will be understood that the method and apparatus may be modified in various respects to suit the particular preference of the designer, or the particular purpose to which the apparatus is to be put, without departing from the scope of this invention.

I claim:

1. The combination of a liquid container, a condenser having at least a portion of its surface exposed to the liquid within said container, a heating device for receiving liquid from said container and from said condenser, a reservoir, and means for delivering heated liquid to said reservoir from said device.

2. The combination of a liquid container, a reservoir, a heating device connected with said container for receiving liquid from said container, means for delivering heated liquid from said device to said reservoir, and an intermittently acting device for automatically controlling the flow of the liquid intermittently through said heating device.

3. The combination of a liquid container, a reservoir, a container for material, a heating device external to and connected with said liquid container for receiving liquid from said liquid container, means for delivering heated liquid from said device over the material in said second named container, and an intermittently acting device for automatically controlling the flow of the liquid intermittently through said heating device.

4. The combination of a liquid container, means for heating the liquid, a reservoir for receiving the heated liquid, and a siphon in said reservoir for emptying same outside said container upon the accumulated liquid in said reservoir attaining a certain level.

5. The combination of a liquid container, means for heating the liquid, a reservoir for receiving the heated liquid, and a compound siphon therein for emptying same outside said container upon the accumulated liquid in said reservoir attaining a certain level.

6. The combination of a liquid container, means for heating the liquid, a reservoir for receiving the heated liquid, and a compound siphon therein comprising an element closed at the top and a second element having a short leg and a long leg within said first-named element for emptying same outside said container upon the accumulated liquid in said reservoir attaining a certain level.

7. The combination of a liquid container, a heating device, an automatic controlling device connected between said container and said heating device for automatically supplying liquid intermittently from said container to said heating device and a reservoir for receiving heated liquid intermittently from said heating device.

8. The combination of a liquid container, means for heating liquid as taken from said container, a condenser connected with said means and having at least a portion of its surface exposed to the liquid in said container, said condenser supplying liquid to said means from said container, delivery means comprising a sprayer connected with said first-named means, and a receptacle for receiving liquid as delivered from said last-named means.

9. The combination of a liquid container, heating means for intermittently receiving and heating liquid taken from said container, a condenser connected with said means and having at least a portion of its surface exposed to the liquid in said container, said condenser supplying liquid to said means from said container, delivery means for conveying heated liquid from said first-named means, a container for receiving liquid from said second-named means, and a reservoir for receiving liquid from said container.

10. The combination of a liquid container, heating means for intermittently receiving and heating liquid taken from said container, an automatic device connected between said container and said heating means for intermittently supplying liquid from said container to said heating means, delivery means for conveying heated liquid from said first-named means, a container for receiving liquid from said second-named means, and a reservoir for receiving liquid from said container, said reservoir comprising a siphon for emptying said reservoir upon the liquid in said reservoir attaining a certain level.

11. The combination of a liquid container, a condenser therein, a heating device for heating the liquid as intermittently received from said condenser, means connected with said device for delivering heated liquid therefrom, and a reservoir for receiving the delivered liquid.

12. The combination of a liquid container, a heating device for heating liquid received from said container, means for receiving heated liquid from said device and for spraying the same, a reservoir, and a container for material connecting with said reservoir and adapted to receive heated liquid from said means.

13. The combination of a liquid container, a device connected with said container for heating liquid as received from said container, means for delivering heated liquid from said device, a receptacle for receiving said liquid, and automatic controlling means controlled by said receptacle for stopping the operation of said heating device when a predetermined amount of liquid has been received by said receptacle.

14. The combination of a liquid container, a device connected with said container for heating liquid as received from said container, means for delivering heated liquid from said device, a receptacle for receiving said liquid, and automatic controlling means controlled by said receptacle for stopping the operation of said heating device when a predetermined amount of liquid has been received by said receptacle, said controlling means comprising a device biased to a certain position and moved to an inoperative position when the liquid in said receptacle exceeds a certain amount.

15. The combination of a liquid container, an electric device connected with said container means for heating liquid as received from said container, a receptacle for receiving the heated liquid, and means controlled by said receptacle for automatically breaking the circuit of said device when the liquid in said receptacle exceeds a certain amount.

16. The combination of a liquid container, a device connected with said container for heating liquid as received from said container, a pivoted lever, a receptacle carried by said lever biased to a certain normal position, and means controlled by movement of said lever when the liquid in said receptacle exceeds a certain amount for automatically stopping the action of said device.

17. The combination of a liquid container, a device connected with said container for heating liquid as received from said container, a pivoted lever, a receptacle carried by said lever biased to a certain normal position, means controlled by movement of said lever when the liquid in said receptacle exceeds a certain amount for automatically stopping the action of said device, and means for heating the liquid in said receptacle without reference to the automatic control of said device.

18. The combination of a liquid container, means for heating the liquid as received from said container, a device for causing liquid to be delivered from said container to said means intermittently, a sprayer for delivering liquid from said means, a reservoir and a siphon therein, a container for material receiving the heated liquid from said sprayer and delivering the same to said reservoir, a pivoted device for controlling the heating of said first-named means, a receptacle functionally related to said pivoted device adapted to receive liquid from said reservoir, and means for maintaining the liquid, in said receptacle, hot.

19. The method of making a beverage which consists in intermittently withdrawing small quantities of liquid from a source, successively heating said small quantities of liquid, successively splashing small quantities of the heated liquid over the material from which the beverage is to be made, and permitting said liquid to drain through said material into a receptacle before being subjected to another splashing of said heated liquid.

20. The combination of a liquid container, a device for receiving liquid from said container, means for heating the liquid in said device, a reservoir, means for delivering heated liquid from said device to said reservoir, and a condenser connected with said container and with said device and having at least a portion of its surface engaging the liquid in said container for intermittently receiving liquid from said container and delivering same to said device.

21. The combination of a liquid container, a device for receiving liquid from said container, means for heating the liquid in said device, a reservoir, means for delivering heated liquid from said device to said reservoir, and a condenser located within said container and having at least a portion of its surface engaging the liquid in said container and connected with said container and with said device for intermittently receiving liquid from said container and delivering same to said device.

22. The combination of a liquid container, a device located below said container having an inlet and an outlet opening, means for heating the liquid in said device, a condenser having at least a portion of its surface engaging the liquid in said container connected between the inlet of said device and said container, a reservoir, and means for delivering heated liquid from the outlet of said device to said reservoir.

23. The combination of a liquid container, a device for receiving liquid from said container, means for heating the liquid in said device automatic means connected between said device and said container for intermittently feeding liquid from said container to said device, a reservoir, and means for delivering heated liquid to said reservoir.

24. The combination of a liquid container, a device for receiving liquid from said container located beneath said container extending in a substantially horizontal direction and having an inlet connecting with the lower portion of said container and also having an outlet for discharging the liquid from said device, and means for heating the liquid within said device.

25. The combination of a liquid container, a device located beneath said container extending in a substantially horizontal direction, said device having inner and outer passages for the flow of the liquid in reverse directions, and having a connection between said outer passage and said container and having a discharge outlet from said inner passage, and means for heating the liquid within said device.

26. The combination of a liquid container, a device located beneath said container extending in a substantially horizontal direction, said device having inner and outer passages for the flow of the liquid in reverse directions, and having a connection between said outer passage and said container and having a discharge outlet from said inner passage, and a resistive element enveloping said device for heating the liquid within said device.

27. The combination of a liquid container, a device located beneath said container extending in a substantially horizontal direction, said device having inner and outer passages for the flow of the liquid in reverse directions, and having a connection between said outer passage and said container and having a discharge outlet from said inner passage, a reservoir for receiving liquid derived from said discharge outlet, a resistive element for heating the liquid within said device, and means for breaking the circuit through said element when the liquid in said reservoir exceeds a certain amount.

28. The combination of a liquid container, a device located beneath said container extending in a substantially horizontal direction, said device having inner and outer passages for the flow of the liquid in reverse directions, and having a connection between said outer passage and said container and having a discharge outlet from said inner passage, a reservoir for receiving liquid derived from said discharge outlet, a resistive element for heating the liquid within said device, a carrier for said reservoir biased to move in one direction, and contacts controlled by the movement of said carrier for breaking the circuit through said resistive element when the liquid in said reservoir exceeds a certain amount.

29. The combination of a liquid container, a heating device at the lower portion of said container for receiving liquid therefrom and extending in a substantially horizontal direction, said device having an inlet connecting with said container and having an outlet, a receiver at the side of said container, an upwardly extending connection from said outlet and discharging into said receiver, a reservoir at the side of said container below said receiver and receiving liquid from said receiver, and means for controlling the heating of said device when the liquid in said reservoir exceeds a certain amount.

30. The combination of a liquid container, a heating device at the lower portion of said container for receiving liquid therefrom and extending in a substantially horizontal direction, said device having an inlet connecting with said container and having an outlet, a receiver at the side of said container, an upwardly extending connection from said outlet and discharging into said receiver, a reservoir at the side of said container below said receiver and receiving liquid from said receiver, means for heating the liquid in said reservoir, and means for controlling the heating of said device when the liquid in said reservoir exceeds a certain amount without controlling the heating of said reservoir.

31. The combination of a liquid container, an electric heating device for heating liquid from said container and delivering the liquid, a reservoir for receiving liquid derived from said device, a carrier for said reservoir, and a spring for holding said carrier on opposite sides of a dead center when moved thereto, said electric heating device being controlled by the movement of said carrier.

HAROUTIUN K. KOUYOUMJIAN.